(12) United States Patent
Wible

(10) Patent No.: US 7,191,645 B2
(45) Date of Patent: Mar. 20, 2007

(54) DYNAMIC MIXED GAS FLOWMETER

(75) Inventor: Eric J. Wible, Carlsbad, CA (US)

(73) Assignee: Fluid Components International LLC, San Marcos, CA (US)

(*) Notice: Subject to any disclaimer, the term of this patent is extended or adjusted under 35 U.S.C. 154(b) by 28 days.

(21) Appl. No.: 10/641,685

(22) Filed: Aug. 14, 2003

(65) Prior Publication Data

US 2005/0034532 A1  Feb. 17, 2005

(51) Int. Cl.
*G01F 1/68* (2006.01)
(52) U.S. Cl. .................. 73/204.18; 73/204.23
(58) Field of Classification Search ........... 73/204.18, 73/663, 202–204.27; 702/100
See application file for complete search history.

(56) References Cited

U.S. PATENT DOCUMENTS

| | | | | |
|---|---|---|---|---|
| 3,060,737 A * | 10/1962 | Arragon | ................ | 73/861.02 |
| 3,425,277 A * | 2/1969 | Adams | ................ | 73/204.16 |
| 3,616,677 A * | 11/1971 | Oppegaard | ............ | 73/23.21 |
| 4,083,244 A * | 4/1978 | Agar et al. | ............ | 73/204.21 |
| 4,885,938 A * | 12/1989 | Higashi | ................ | 73/204.18 |
| 4,934,189 A * | 6/1990 | Tanimoto et al. | ...... | 73/204.14 |
| 4,967,593 A | 11/1990 | McQueen | | |
| 4,994,780 A | 2/1991 | McQueen | | |
| 5,117,216 A * | 5/1992 | McQueen | ................ | 338/24 |
| 5,117,691 A * | 6/1992 | Fraser | ................ | 70/204.15 |
| 5,134,772 A | 8/1992 | McQueen | | |
| 5,221,916 A * | 6/1993 | McQueen | ................ | 338/24 |
| 5,235,844 A * | 8/1993 | Bonne et al. | ............ | 73/24.01 |
| 5,237,523 A * | 8/1993 | Bonne et al. | ............ | 702/100 |
| 5,263,369 A * | 11/1993 | Cutler | ................ | 73/204.15 |
| 5,311,447 A * | 5/1994 | Bonne | ................ | 702/50 |
| 5,339,687 A * | 8/1994 | Gimson et al. | ........ | 73/204.19 |
| 5,355,727 A | 10/1994 | McQueen | | |
| 5,438,866 A * | 8/1995 | McQueen | ............ | 73/204.25 |
| 5,551,283 A * | 9/1996 | Manaka et al. | ........ | 73/31.01 |
| 5,582,628 A * | 12/1996 | Wood | ................ | 73/204.18 |
| 5,600,528 A | 2/1997 | McQueen | | |
| 5,753,815 A * | 5/1998 | Murata | ................ | 73/204.15 |
| 5,780,737 A * | 7/1998 | Wible et al. | ............ | 73/204.22 |
| 5,913,250 A * | 6/1999 | Wible | ................ | 73/861.65 |
| 6,208,254 B1 | 3/2001 | McQueen et al. | | |
| 6,272,919 B1 * | 8/2001 | Huiberts | ................ | 73/204.18 |
| 6,536,273 B2 * | 3/2003 | Schrittenlacher | ........ | 73/204.11 |
| 6,539,793 B2 * | 4/2003 | Tanimoto et al. | ........ | 73/204.15 |
| 6,629,455 B2 * | 10/2003 | Schrittenlacher et al. | | 73/204.22 |
| 6,820,480 B2 * | 11/2004 | De'Stefani et al. | ...... | 73/204.18 |

FOREIGN PATENT DOCUMENTS

WO  WO 9214995 A1 * 9/1992

* cited by examiner

*Primary Examiner*—Hezron Williams
*Assistant Examiner*—John Fitzgerald
(74) *Attorney, Agent, or Firm*—The Maxham Firm

(57) ABSTRACT

A compensated flowmeter having a probe adapted to project into flowing media within a conduit. The probe includes a thermal dispersion sensor, and a compensating gas properties sensor contained within a no-flow chamber of the probe. The thermal flow sensor has active and reference sensor elements that responsively provide output signals relating to a flow rate of the media. The compensating gas properties sensor has compensating active and reference sensor elements that responsively provide output signals relating to the heat transfer of the media. A suitable processor is typically implemented for adjusting the measured flow rate detected by the thermal dispersion sensor to compensate for changes in heat transfer detected by the compensating gas properties sensor.

24 Claims, 8 Drawing Sheets

DYNAMIC MIXED GAS FLOWMETER

BACKGROUND OF THE INVENTION

1. Field of the Invention

The present invention relates to flow sensors, and more particularly to a thermal dispersion flowmeter that compensates for variable mixed-gas compositions.

2. Discussion of the Related Art

Thermal dispersion flowmeters are a common choice for flow metering devices in the commercial and industrial metering markets. A typical sensor element for use in such meters is the resistance temperature detector (RTD), the resistance of which is related to the temperature of the element itself. A typical sensor employs at least two RTD elements. One RTD element is used as a reference element and is normally unheated. The second RTD is used as the active element which is heated. In use, the effect of flow on the heated RTD element provides a measure of the flow velocity of the substance in the duct or conduit being monitored.

Two different methods are commonly used in the thermal dispersion industry to determine the flow in a conduit. One technique is to maintain a constant temperature differential between the reference RTD and the active RTD. This method measures the voltage or current required to maintain the active RTD at a constant temperature above the reference RTD while heat is removed from the active RTD due to the physical properties of the flowing media. The other method measures the voltage difference between the active and the reference RTDs, while the active RTD is heated by a constant current or a constant power heat source. During this measurement, as with the other method, the active RTD loses heat by way of the physical properties of the flowing media.

One factor that affects the accuracy of conventional flowmeters is the consistency of the physical composition of flowing media. In many applications, the flowing media maintains the same general composition, in which case conventional flowmeters could provide sufficiently accurate flow rate measurements. However, in situations such as flare gases and other variable mixed-gas composition situations, the physical composition of the media is constantly changing, resulting in significant challenges for obtaining accurate flow rates.

SUMMARY OF THE INVENTION

The compensated flowmeter of the present invention includes a probe adapted to project into flowing media within a conduit. The probe includes a thermal flow sensor, and a compensating gas properties sensor contained within a no-flow chamber of the probe. The thermal flow sensor may be formed with active and reference sensors that responsively provide output signals relating to a flow rate of the media. The compensating gas properties sensor may be formed with compensating active and reference sensors that responsively provide output signals relating to the heat transfer of the media. A suitable processor is typically implemented for adjusting the measured flow rate detected by the thermal flow sensor to compensate for changes in heat transfer detected by the compensating gas properties sensor.

BRIEF DESCRIPTION OF THE DRAWING

The above and other aspects, features and advantages of the present invention will become more apparent upon consideration of the following description of preferred embodiments taken in conjunction with the accompanying drawing figures, wherein.

DETAILED DESCRIPTION OF THE PREFERRED EMBODIMENTS

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Figure 1:
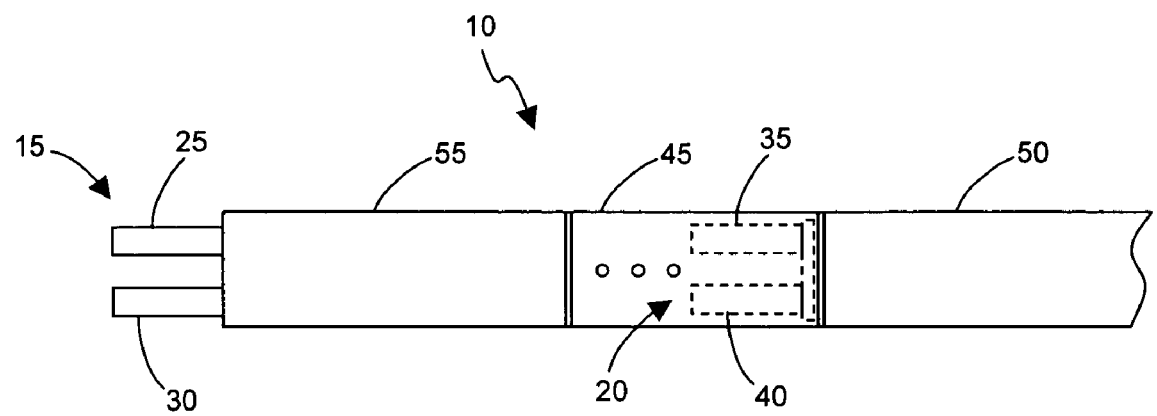
FIG. 1 is a side view a flowmeter probe containing flow and gas properties sensors, in accordance with the invention.

Referring now to FIG. 1, a side view of probe 10 in accordance with one embodiment of the present invention is shown. Probe 10 generally includes thermal flow sensor 15 and gas properties sensor 20. The flow sensor may be configured with a pair of thermal devices such as resistance temperature detectors (RTDs). As shown, the flow sensor includes one RTD that is heated and is the active sensor element 25, while the other RTD is a relatively or substantially unheated reference sensor element 30.

In operation, gas mixture flows past the active and passive elements of sensor 15 in a conduit causing heat dissipation from the active sensor, in comparison with the dissipation from the reference sensor element. Typical flow rates range anywhere from about one-half to about 300 standard feet per second (SFPS). A change in differential temperature ($\Delta T$) is reflected as a change in differential resistance ($\Delta R$). The $\Delta T$ or $\Delta R$ value may be correlated to the instantaneous flow rate of the gas mixture in the conduit. The use of $\Delta R$ is one of the many possible techniques for calculating flow rate. Other techniques will be described in more detail herein.

Similar to flow sensor 15, gas properties sensor 20 (shown in dashed lines) may include active and reference RTD sensor elements 35 and 40. These elements are shown contained within mid-well 45, and are positioned between proximal and distal probe elements 50 and 55. In operation, gas mixture flows into a no-flow chamber of the mid-well, coming into contact with the exposed active and passive sensor elements 35 and 40. The differential resistance reflects the heat transfer of the gas mixture in the mid-well. A change in differential resistance ($\Delta R$) may be correlated to a change in the heat transfer of the gas mixture and therefore a change in the gaseous constituents of the gas mixture.

The exemplary description above has generally assumed that the active and reference sensor elements are heat-differential-based, a primary example being RTDs. However, other thermally-based sensors may be used including thermocouples, thermopiles, thermistors, transistors, and diodes, among others.

Figure 2:
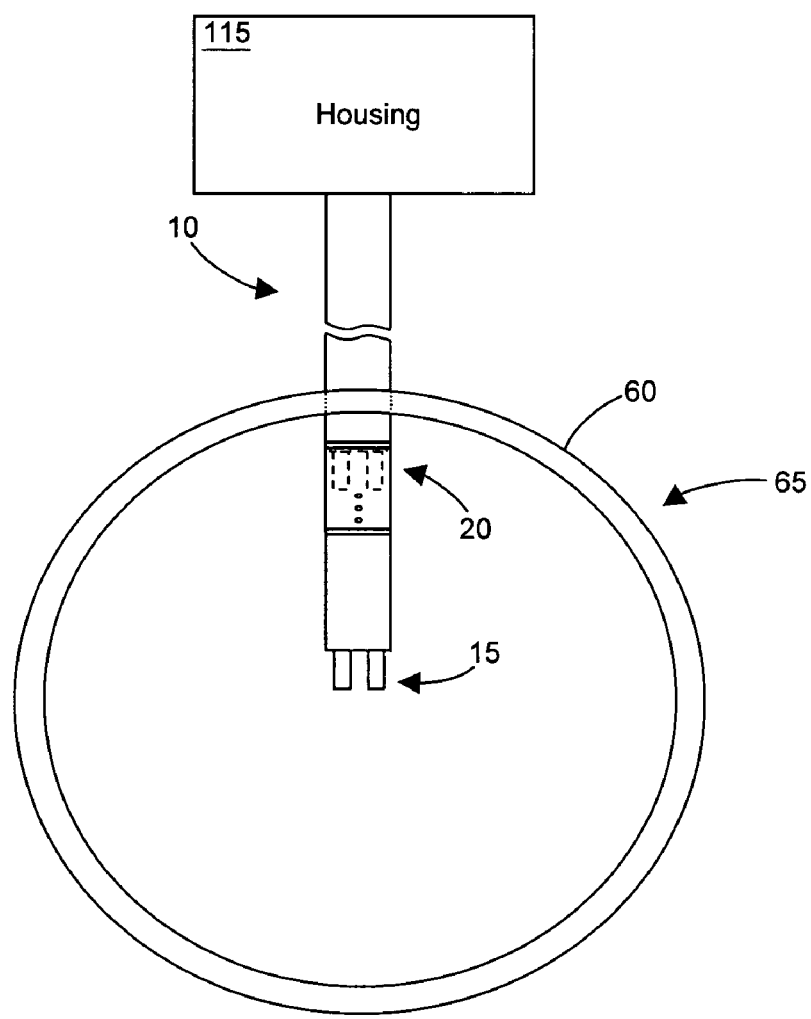
FIG. 2 shows an exemplary implementation of the flow meter probe of FIG. 1 positioned within a conduit.

FIG. 2 shows a typical implementation of probe 10 configured in wall 60 of conduit 65. In use, gas properties sensor 20 exploits the principal that gases having different constituents exhibit varying levels of heat transfer. Consider, for example, the situation where a gas mixture is flowing at a constant rate through a conduit. If the composition of the gas mixture changes, so does the heat transfer of the gas mixture. A change in heat transfer affects the heat dissipation rate of the active sensor of the flow sensor, and consequently the flow rate. This means that actual flow rate may be constant, but a change in the constituents of the gas will be reflected as a change in flow rate. The difference between the actual and measured flow rates may be referred to as flow error.

For any flow error, the measured flow rate may change (higher or lower) even though the actual flow rate of the gas mixture remains constant. For example, as the heat transfer of the gas mixture rises, a measured (not actual) flow rate would increase. Conversely, as the heat transfer of the gas mixture falls, the measured flow rate would decrease.

The correction of flow error caused by changing physical properties of the gas mixture may be accomplished by compensating for the heat transfer of the gas mixture. That is, if the heat transfer of the gas mixture can be determined, more accurate flow rates of the gas mixture may be obtained. Correction of flow error can be important in variable mixed-gas composition measurement applications.

In accordance with the present invention, gas properties sensor 20 is configured as a still well to detect the heat transfer of the gas media flowing in the conduit, and is used in cooperation with flow sensor 15. In operation, the flow sensor will measure the flow rate of a gas mixture in conduit 65, while the gas properties sensor measures the heat transfer of the gas. As will be described in more detail herein, the measured flow rate is then adjusted as necessary to compensate for any change in heat transfer of the gas mixture.

Figure 3:
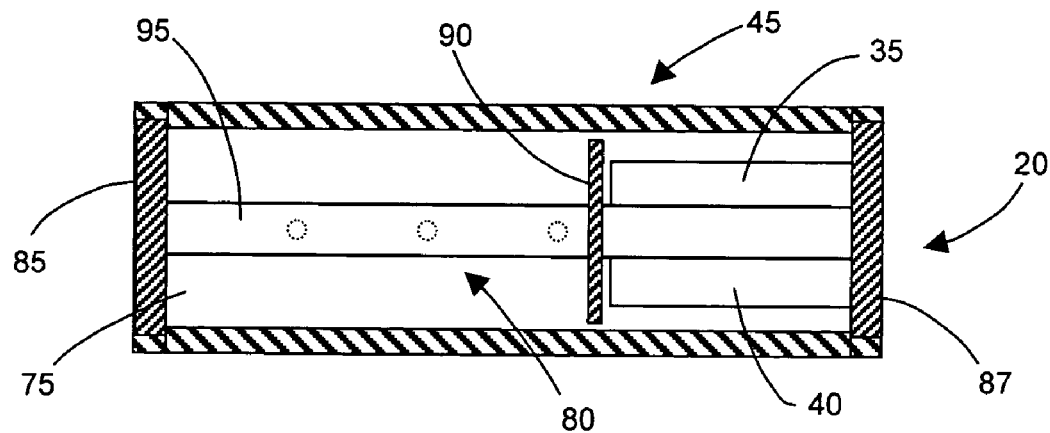
FIG. 3 is an assembled, enlarged cross-sectional diagram showing a more detailed view of the various components contained, according to one embodiment of the invention, within the mid-well portion of the flowmeter probe of FIG. 1.

FIG. 3 is an assembled, cross-sectional diagram showing a more detailed view of the various components contained, according to one embodiment of the invention, within the mid-well portion of the flowmeter probe. Mid-well 45 is shown having endplates 85 and 87 to seal its interior from the other parts of the probe. To ensure that flow is not a factor to sensor elements 35 and 40, downstream holes 80 allow gas to enter into no-flow chamber 75. These gas holes permit sufficient quantities of gas to enter the no-flow chamber, and in conjunction with baffle 90, to come into contact with active and reference sensors 35 and 40. Typically, the mid-well is configured with one or more apertures, but other designs are possible. Tube 95 has an additional function that will be described in later figures.

To optimize the heat transfer measurements performed by gas properties sensor 20, it is desirable to minimize the flow of gas within the no-flow chamber. The essence of the mid-well configuration shown in these figures is to permit the active and reference sensors to sample the flowing gas in a quiescent or "no flow" surroundings. Baffle 90 is typically utilized to further reduce gas flow within the chamber. The particular design of a no-flow environment created within mid-well 45 is not critical or essential, and any other suitable design that permits sufficiently accurate heat transfer measurements by sensor 20 may be used.

Figure 4:
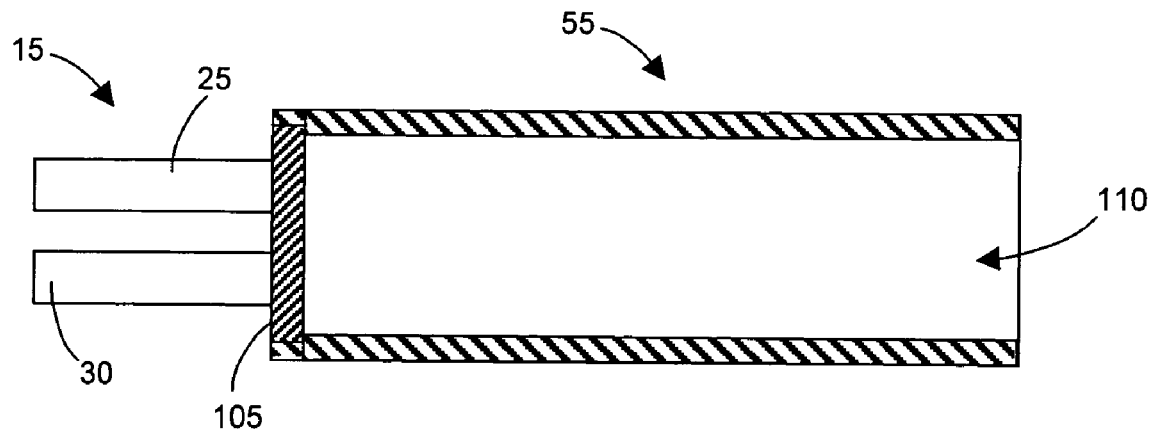
FIG. 4 is a cross-sectional diagram showing a more detailed view of the thermal flow sensor portion of the flowmeter probe of FIG. 1.

FIG. 4 is a cross-sectional diagram showing a more detailed view of thermal flow sensor 15. A suitable device, such as base plate 105, may be used to couple the active and reference sensors 25 and 30 to the distal element. Distal element 55 is shown having cavity 110, which may be used for routing the wiring required to connect the sensors to the circuitry.

Figure 5:
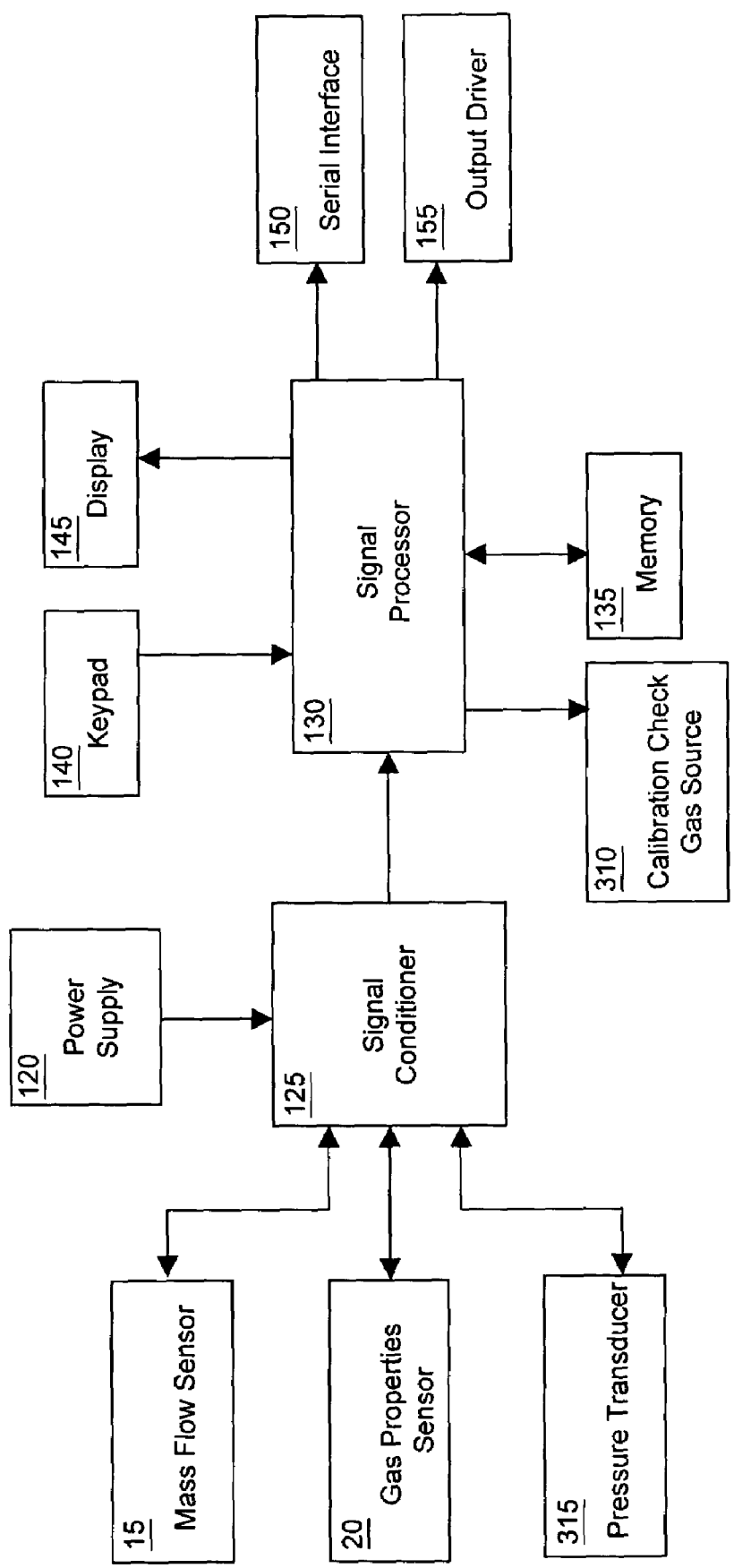
FIG. 5 is a simplified exemplary block diagram showing the basic circuitry components which may be coupled to the flow and gas properties sensors.

FIG. 5 is an example of a simplified block diagram showing the basic circuitry components which may be coupled to flow and gas properties sensors 15 and 20. This figure will be described with reference made to the probe components depicted in FIGS. 1 and 2. It is to be understood that the components depicted in this figure are exemplary, and many other configurations are possible. These components may be positioned within housing 115, which is normally immediately outside conduit 65. Alternatively, some or all of the non-sensor element components shown in FIG. 5 could be located at a central, remote, location.

Power supply 120 is shown providing the necessary power to the flowmeter, while signal conditioner 125 develops power levels and signal formats that may be required for the various components in the meter. In use, signal outputs generated by flow and gas properties sensors 15 and 20 are directed to the signal conditioner, ultimately reaching signal processor 130. Using any of a variety of known techniques, the signal processor determines the flow rate based upon the outputs from the flow sensor, and the heat transfer of the flowing gas based upon the outputs from the gas properties sensor. In accordance with the present invention, the signal processor further provides a compensated flow rate that accounts for any change in the heat transfer of the flowing gas mixture. This feature will be described in more detail with regard to the graphs of FIGS. 6–9.

The power supply can provide any appropriate power level and format to the flowmeter, as determined by the signal conditioner. Typically it will supply a variable 20–42 volts dc (VDC) to power and heat sensors 15 and 20, and a regulated 5 VDC for the digital logic. The 5 VDC is a current standard, but the power to the flowmeter components could be modified as may be required or desired. The power supply may itself be powered by an incoming source of 115 or 230 volts ac (VAC), or 24 VDC.

Any of a variety of different techniques may be used for controlling flow sensor 15 to determine flow rate, and for controlling gas properties sensor 20 to determine the heat transfer of the flowing gas. For example, one technique is where signal conditioner 125 is configured to convert 20–42 VDC to a constant current of 0.5 mA to energize the reference sensors 30 and 40, and 20 mA to heat active sensors 25 and 35.

In operation, with regard to the flow sensor, the signal conditioner senses the voltages across sensors 25 and 30 to determine the voltage difference ($\Delta V$). The $\Delta V$ results from a resistance change ($\Delta R$) at constant current, which is proportional to ΔT, providing a basis for calculating the flow rate of the media involved in accordance with known technologies. The signal conditioner senses the voltages across sensors 35 and 40 in similar fashion to determine the ΔR for this particular sensor, thus providing a basis for calculating the heat transfer of the gas. The heating current of 20 mA is an example only and any stimulation which produces the desired result can be used.

Another technique may be where signal conditioner 125 operates with respect to active and reference sensors 25 and 30 as a constant power source, where the current to and voltage across these sensors can vary. In this configuration, the signal conditioner typically includes a multiplier circuit which monitors the power (V×I) for each of these sensors and holds that power constant. The change in either current to or voltage across the active sensor is related to resistance change (ΔR) (and hence, temperature change (ΔT)), and is therefore used to calculate the flow rate of the media. The active and reference sensors 35 and 40 may be similarly controlled such that the change in either current to or voltage across the active sensor 35 is related to ΔR and ΔT, which may be used to determine heat transfer.

Still another possibility for obtaining the necessary measurements is to hold the differential temperature ΔT of the active and reference RTDs constant. According to this scheme the power is varied as a function of the flow rate or heat transfer. That is, as the flow rate increases (or heat transfer increases), additional power must be applied to the heated RTD sensor in order to hold the temperature constant.

In this technique, the signal conditioner maintains a constant ΔT. Since the resistance and temperature relationship for an RTD is fixed, ΔR is also constant. To maintain ΔT or ΔR constant, both ΔV and ΔI, or Δ power, can be monitored to provide a basis for calculating flow rate, or in the case of the gas properties sensor, for calculating heat transfer. These calculations may be obtained using any particular process temperature as a function of the power needed to hold a constant temperature difference.

As yet another alternative, voltage can be maintained constant, which is the converse of the constant current scheme described above. When ΔV is maintained constant, the current changes with temperature changes. The ΔI provides the basis for determining flow rate (sensor 15) or heat transfer (sensor 20).

The above described methods for determining flow rate of flowing gas, and for measuring heat transfer of a no-flow sample of the flowing gas, are well known to those of ordinary skill in the field of heated sensor technology. Whether sensors 25, 30, 35, and 40 are operated as constant current, constant power, constant differential temperature, or constant voltage, it is possible to reverse the sensor roles to supply the heating stimulation to what had been the reference sensor and to supply the lower, non-heating stimulation to what had been the active sensor. The same measuring technique is typically used for both the flow sensor and the gas properties sensor, but this is not a requirement and different measuring techniques may be used, if desired.

As described above, the flow and gas properties sensors are each typically configured with two distinct sensors; an active sensor and a reference sensor. However, other configurations are possible. For example, a single element sensor may operate in a time-shared fashion, where it serves as the heated sensor for a predetermined short period of time. Then, the sensor is allowed to cool (20–40 seconds being typical) to serve as the substantially unheated, reference sensor. A reference measurement may then be obtained and the heating-cooling cycle may be repeated on a continuous or periodic basis as may be required or desired.

Signal processor 130 could be a microprocessor, hard wired state machine, digital signal processor, microcontroller, application specific integrated circuit (ASIC), embedded processor, or any other suitable control or processing device. The signal processor is typically configured with appropriate memory 135 for processing, recording, and storing data relating to the operation of the flowmeter. The memory unit may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, or other similar memory or data storage means.

A primary function of the signal processor is to calculate an initial, uncorrected, flow rate of the gas media from the output of flow sensor 15, and the heat transfer of a no-flow sample of the gas from the output of gas properties sensor 20. The signal processor further provides a corrected flow rate of the gas media based upon the uncorrected flow rate, as compensated for any change in the heat transfer of the gas.

Again, the initial, uncorrected, flow rate and heat transfer can be determined based upon ΔR, ΔT, ΔI, ΔV, or any other suitable measuring technique. Instructions for operation of the flowmeter can be applied to the signal processor by a suitable entry device such as keypad 140. Local output from the flowmeter may be shown on display 145, which may be a CRT, LCD, LED screen, or a printer, or other display device. Additional outputs may be provided by parallel or serial interface 150, which can drive external operations such as controls for the meter or for modifying the monitored process. Output driver 155 may be employed to drive external indicators such as additional displays, a printer, or optical or audible alarms, for example.

Operation of the flowmeter may proceed as follows. First, the flowmeter of FIG. 5 energizes the active RTD sensor 25 with constant current to heat it to a predetermined temperature, and a much smaller constant current will be applied to energize or enable reference RTD sensor 30, but without increasing its temperature to any appreciable extent. Contemporaneously, the active and reference RTD sensors 35 and 40 of gas properties sensor 20 are similarly energized.

As the gas mixture flows past the active and reference sensors 25 and 30 of flow sensor 15, heat will be dissipated from active sensor 25 and the temperature differential will decrease. A change in differential temperature (ΔT) is reflected as a change in differential resistance (ΔR). The ΔR at any time is interpreted by signal processor 130 as a particular flow rate of the gas media flowing in conduit 65, and the flowmeter provides the appropriate outputs. When ΔR decreases, the flowmeter shows an increase in flow rate because heat is more readily dissipated by the gas media from the heated active sensor than the relatively unheated reference sensor. An example of flow rates relative to ΔR values is depicted by curves 215, 220, and 225 in FIG. 6.

The calculated flow rate is typically quite accurate. However, when the composition of the gas mixture changes, the calculated flow rate may include appreciable levels of error. One reason for such error is the change in thermal conductivity or heat transfer of the gas mixture flowing past flow sensor 15. A flare gas stream is one example where variable mixtures of gas compositions are experienced. For example, a typical flare gas stream may contain mixtures of volatile hydrocarbon gases including methane, butane, ethane, and pentane, among others. Gases such as oxygen, nitrogen, carbon dioxide, hydrogen sulfide, hydrogen, and propylene may also be present.

Outputs from gas properties sensor 20 are used to compensate for any inaccuracies of the initially measured flow rate. For example, as detectable amounts of the flowing gas mixture enters the no-flow chamber of mid-well 75, active and passive sensors 35 and 40 of gas properties sensor 20 are exposed to the gas mixture. Similar to the flow sensor, heat will be dissipated from active sensor 35 and the temperature differential will decrease in relation to the heat transfer of the gas mixture. Again, a change in differential temperature ($\Delta T$) is reflected as a change in differential resistance ($\Delta R$).

Since the gas properties sensor is located within a no-flow environment, the $\Delta R$ data relates to heat transfer of the gas mixture, not to flow rate. In situations where the heat transfer of the gas mixture increases, a corresponding decrease in $\Delta R$ is experienced. Conversely, as the heat transfer of the gas mixture decreases, a corresponding increase in $\Delta R$ is detected. If desired, the flowmeter of the present invention may be configured with pressure transducer 315 or calibration check gas source 310, or both. These alternative features will be described in more detail in later figures.

Figure 6:
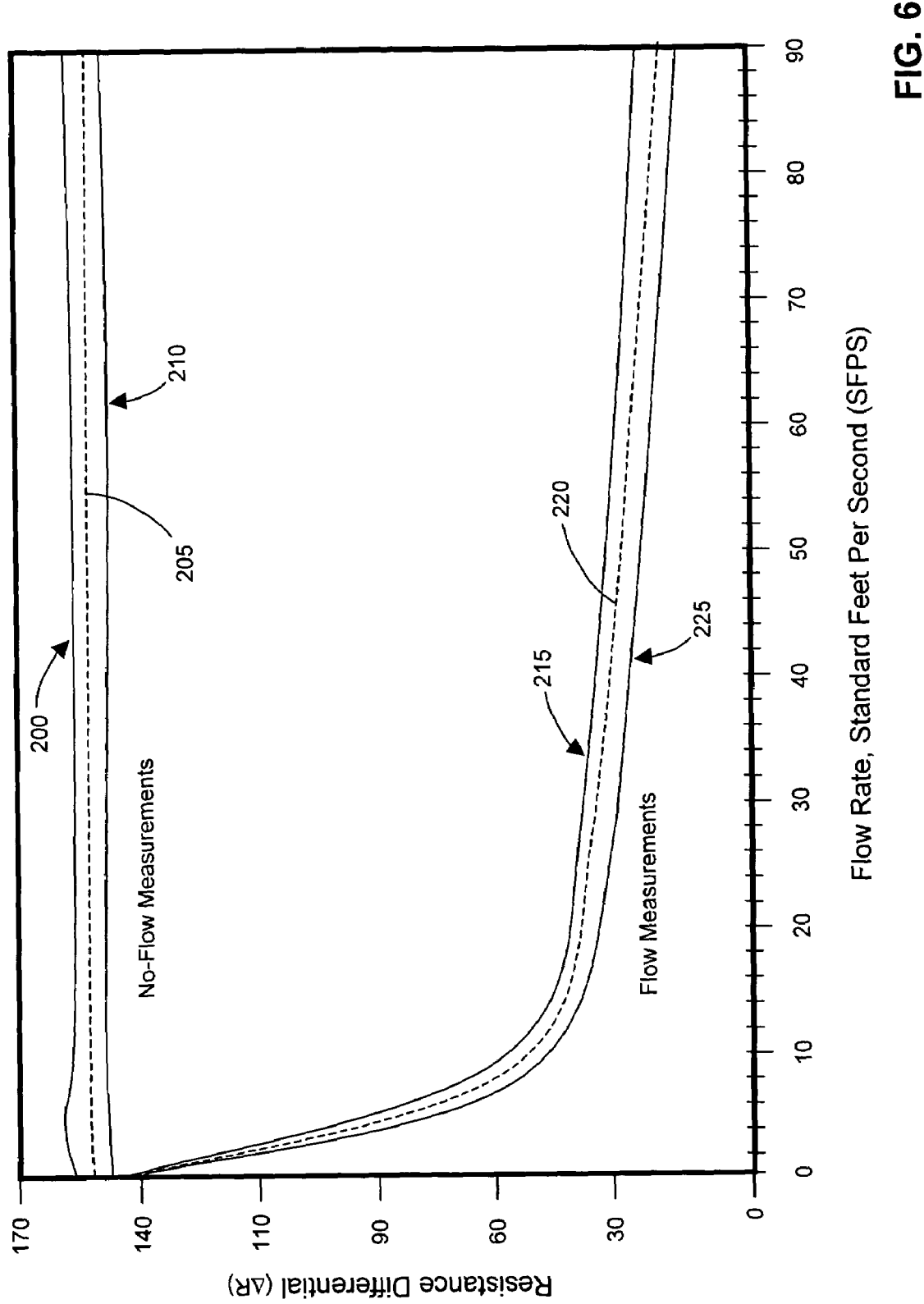
FIG. 6 is a graph showing a particular example of the correlation between $\Delta R$ and the respective outputs of the flow and gas properties sensors.

FIG. 6 is a graph showing a particular example of the correlation between $\Delta R$ and the respective outputs of flow sensor 15 and gas properties sensor 20. Near the top portion of this graph are three line plots associated with outputs generated by the gas properties sensor. Line 200 represents readings obtained from a gas mixture of 100% propane, serving in this example as a baseline gas. Lines 205 and 210 represent readings obtained from gas mixtures of, respectively, 95% propane and 5% hydrogen, and 85% propane and 15% hydrogen. As shown in this graph, the $\Delta R$ of each particular gas mixture remains substantially unaffected by the flow rate. This is because of the no-flow environment in which the gas properties sensor obtains these measurements.

The values of $\Delta R$ for lines 205 and 210 are less than that of line 200 since the $\Delta R$ would naturally decrease as the baseline mixture of 100% propane is replaced with increasing amounts of hydrogen, which exhibits a relatively higher level of thermal conductivity or heat transfer. One way of stating this relationship is to associate the particular gas combinations with a $\Delta R$ value, relative to a baseline gas mixture such as propane.

Flow curve 215 represents readings obtained from flow sensor 15 of a flowing gas mixture of 100% propane, while flow curves 220 and 225 are readings obtained from gas mixtures of, respectively, 95% propane and 5% hydrogen, and 85% propane and 15% hydrogen. The curves and lines in this graph may be associated as follows: line 200 and curve 215; line 205 and curve 220; and line 210 and curve 225. As previously described, a decrease in $\Delta R$ values may be correlated to an increase in flow rate.

The various flow curves readily show that as the composition of the gas mixture changes, so does the $\Delta R$ values and consequently the flow readings of these gases. Conventional sensors are not readily able to compensate for the gas composition changes, and thus are susceptible to errors in flow rate calculations. One technique for overcoming flow measuring errors of variable mixed-gas compositions is to utilize a representative gas mixture for calibrating the flow sensor. However, as can be seen in FIG. 7, this is not always a workable solution because of the possibility of error in a calculated flow rate when the measured gas mixture deviates from a baseline mixture.

Figure 7:
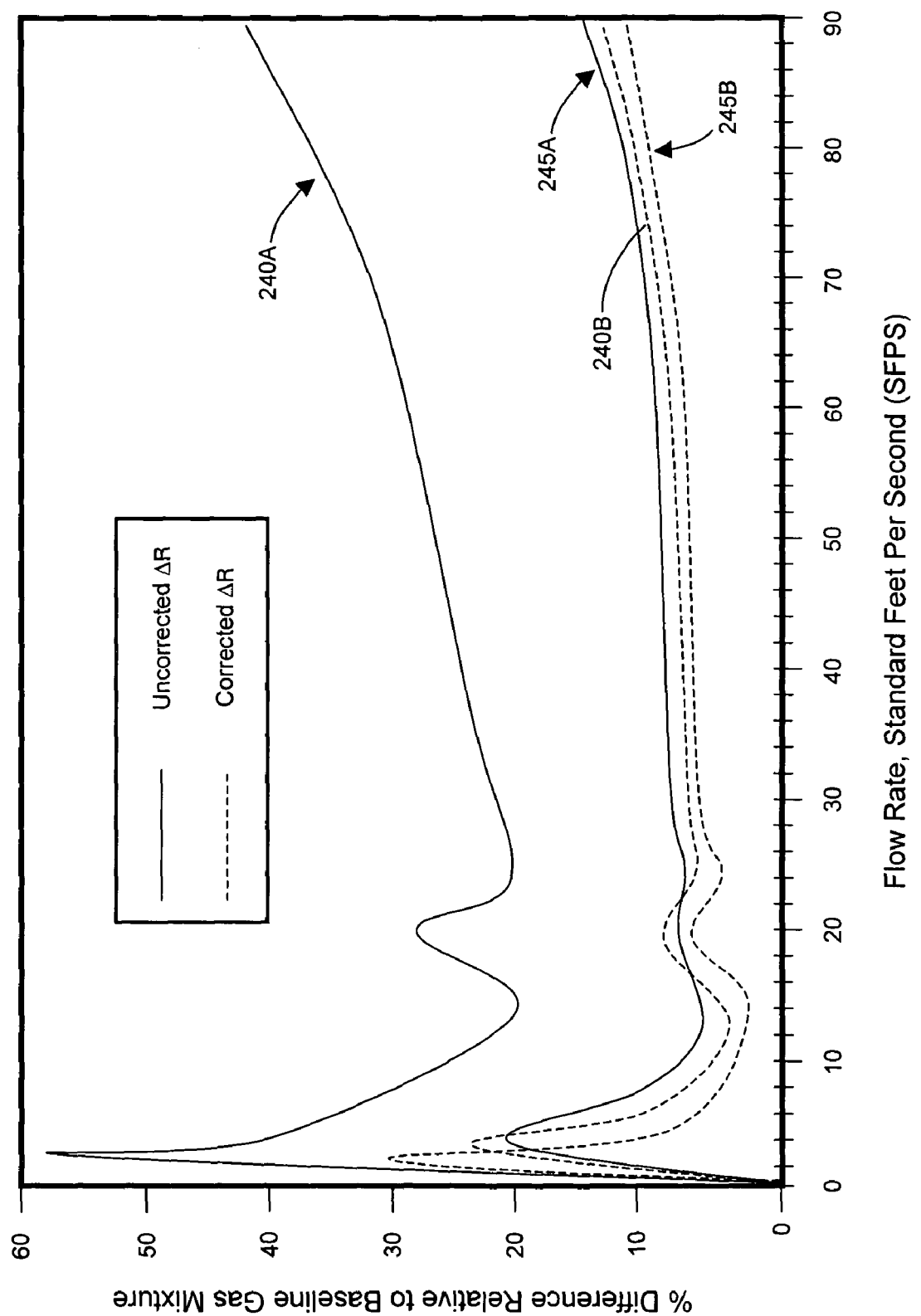
FIG. 7 is a graph showing exemplary flow rates of gas mixtures of varying composition, relative to a baseline gas mixture.

FIG. 7 is a graph showing flow rates of gas mixtures of varying composition, relative to a baseline gas mixture. In this graph, the X-axis represents the baseline gas mixture of 100% propane at a given flow rate, while the Y-axis represents the relative difference between the baseline gas and two separate gas mixtures.

Flow curve 240A reflects the amount of error obtained from a gas mixture of 95% propane and 5% hydrogen, while flow curve 245A is the amount of error obtained from a gas mixture of 85% propane and 15% hydrogen. This graph shows that substantial error in calculated flow rate may occur whenever the gas composition changes from a baseline composition of 100% propane.

In accordance with the present invention, gas properties sensor 20 is adapted to detect changes in heat transfer relative to a baseline gas. Once again, changes in the heat transfer of flowing gas affect the accuracy of the measured flow rate. Consequently, if a change in heat transfer is detected, the measured flow rate is adjusted to compensate for this change.

Examples of corrected flow are also shown in the graph of FIG. 7. Specifically, flow curve 240B represents a correction of the flow calculation of a gas mixture of 95% propane and 5% hydrogen, while curve 245B represents a correction of the flow calculation of a gas mixture of 85% propane and 15% hydrogen. FIG. 7 shows one example of how compensating for a change in heat transfer of a gas mixture provides a considerable increase in accuracy of the calculated flow rate.

The use of 100% propane as a baseline gas has been used herein as one particular example of a possible gas that may be used to calibrate the flowmeter, but any other suitable gas or gas mixture composition may be used. The baseline gas mixture is typically selected as being representative of the gas composition that will be experienced in a particular application, but no single gas composition is required.

Figure 8:
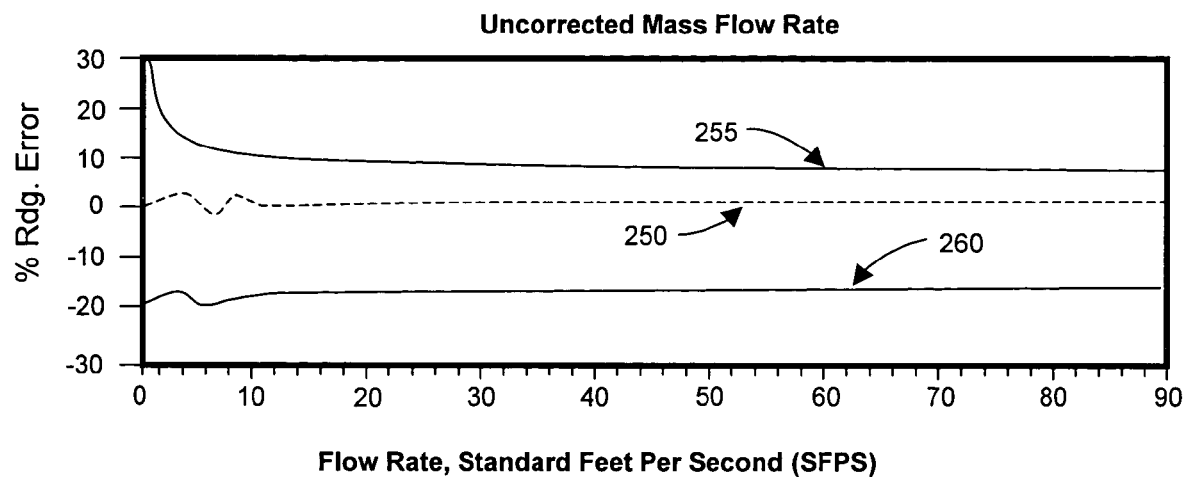
FIGS. 8 and 9 are graphs showing possible flow error rates of gas mixtures of different composition, relative to a baseline gas mixture.
Figure 9:
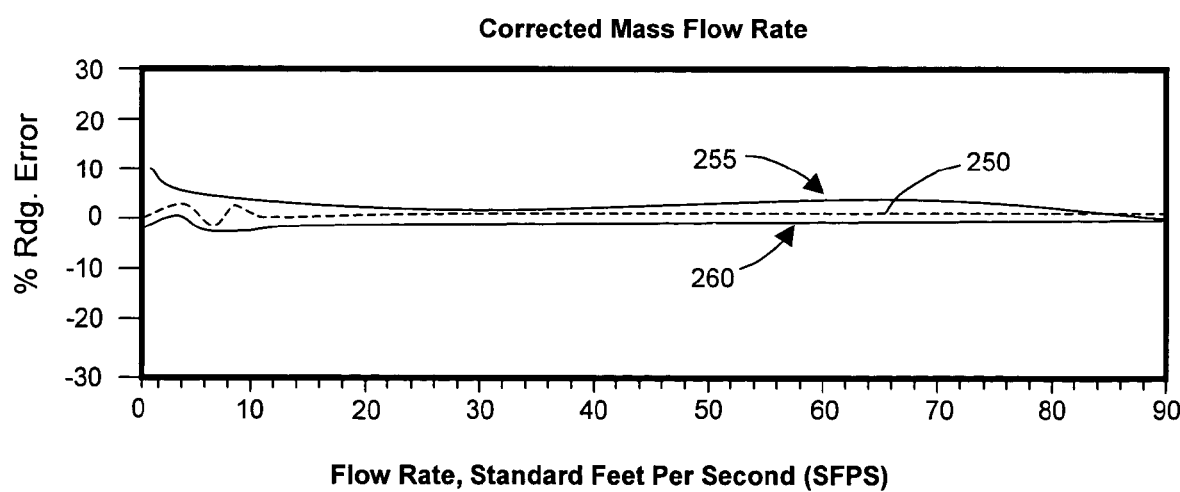

The FIGS. 8 and 9 graphs show possible flow error rates of gas mixtures of different composition, relative to a baseline gas mixture. For example, FIG. 8 shows raw, uncorrected flow data obtained from various gas mixtures using flow sensor 15, while FIG. 9 shows corrected flow data after compensating for changes in heat transfer of the gas mixtures, as detected by gas properties sensor 20.

In these graphs, curve 250 represents flow readings obtained from a baseline gas mixture of 70% $N_2$, 10% $C_4H_{10}$, 6% $CH_4$, and 14% $CO_2$. Curve 255 depicts readings obtained from a gas mixture of 50% $CH_4$ and 50% $N_2$, while curve 260 represents readings obtained from a gas mixture of 50% $CO_2$ and 50% $N_2$. FIG. 8 shows that the initial flow rates generated by the output of flow sensor 15 experience considerable error whenever the measured gas mixtures deviates from the baseline composition. FIG. 9 provides an example of the amount of correction of the initial flow values that may be achieved by compensating for the changes in heat transfer of gas mixtures, relative to a baseline mixture. In this particular example, the original flow error rates were about 10–20% (FIG. 8), which were then corrected to an error rate on the order of a very few percent, on average (FIG. 9).

The flowmeter of the present invention provides highly accurate flow measurements of variable mixed-gas compositions. If desired, the flowmeter may be configured with a number of different features as may be required or desired. By way of illustration, alternative embodiments of the present invention having calibration check or verification capabilities, and pressure sensing devices will now be described.

Figure 10:
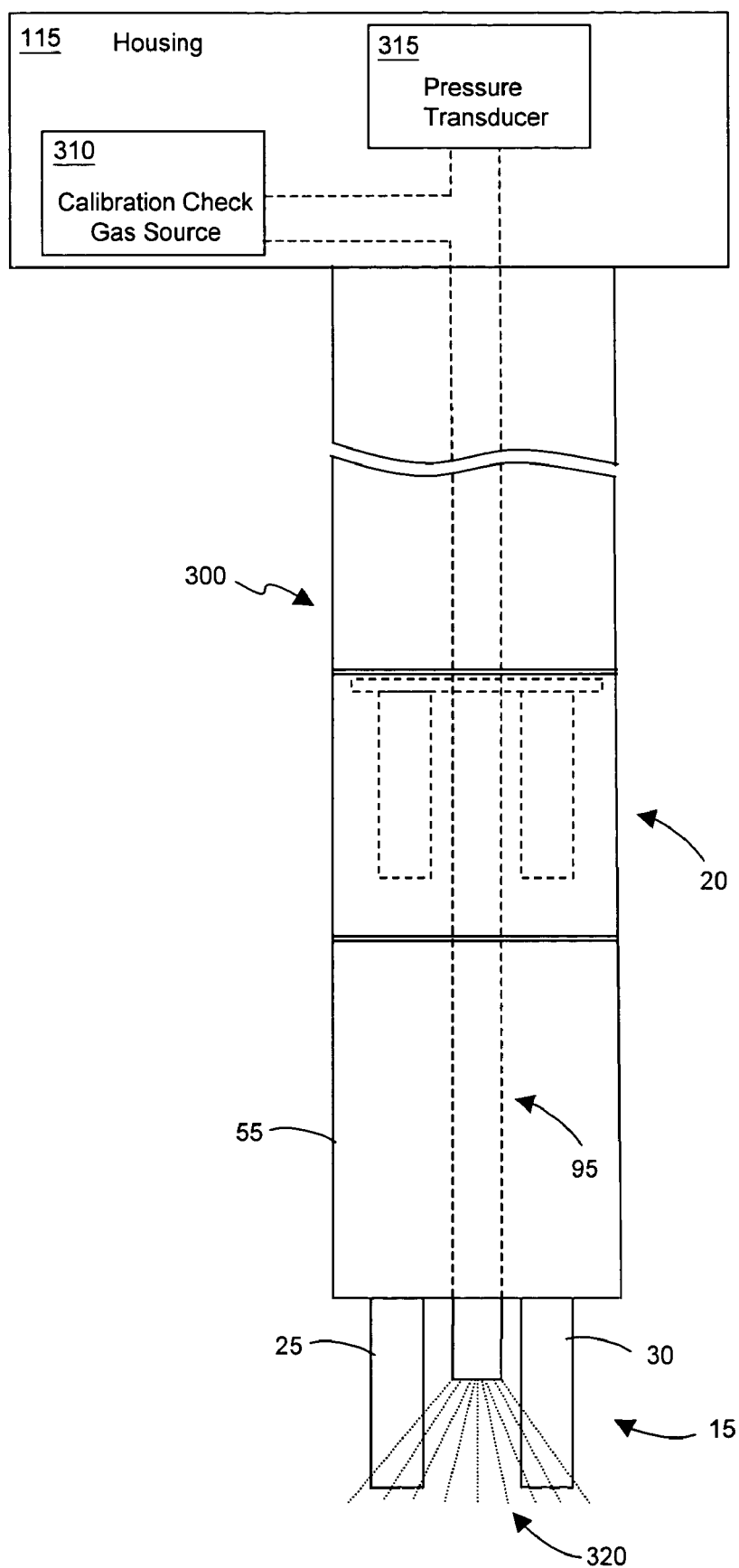
FIG. 10 is a side view of a flowmeter probe configured with calibration and pressure sensing capabilities in accordance with an alternative embodiment of the present invention.

An exemplary embodiment of a flowmeter configured with calibration check capabilities is shown in FIG. 10, which is a side view of probe 300. Probe 300 is similar in many respects to probe 10, which is depicted in FIGS. 1 and 2. The primary difference is that probe 300 is configured with a combination calibration/pressure tube 95. This tube is shown connected to calibration check gas source 310 and pressure transducer 315.

The calibration function enables a user to verify the functionality of flow sensor 15. Probe 300 may have the calibration verified by introducing calibration check gas 320 into tube 95 at a predetermined velocity to impinge upon the sides of active and passive sensors 25 and 30. The calibration check gas source could emit air or any appropriate gas such as dry nitrogen.

The active and passive sensor outputs may then be compared with calibration data in memory to determine the accuracy of the sensors. The calibration check gas source may be configured to operate at a plurality of different flow rates, each flow rate being associated with a particular sensor output. Calibration verification may be accomplished by stimulating the active sensor element with the calibration check gas at two or more different flow rates, and then comparing the various sensor outputs.

A particular calibration check process may proceed as follows. First, calibration check gas source 310 may be activated by a user to provide a suitable check gas 320 at 5 PSI, and the outputs from the flow sensor 15 may be measured to find $\Delta R$, for example. If the measured $\Delta R$ value falls within some predefined limits of an expected $\Delta R$ value, then the sensor is deemed to be operating appropriately. This calibration procedure may be repeated for a range of gas pressures (for example, 10 PSI, 50 PSI, 100 PSI, and others if desired) as may be appropriate in a particular application. The flowmeter calibration check function of this invention is convenient to use and very accurate. An added benefit is that there is no need for additional elements to be temporarily connected to the flowmeter for test purposes, nor does it require any element of disassembly, both common aspects of prior art devices.

Pressure transducer 315 may be implemented whenever pressure readings of the flowing gas media are desired. Pressure readings ranging from about 1–500 psig are typical. As shown, the pressure transducer is coupled with tube 95 which terminates at the distal end of the probe, near flow sensor 15. In operation, as the gas mixture flows through the conduit, the pressure of the gas mixture will also exist in the tube where it is measured by the pressure transducer. A signal output, representing the pressure of the flowing gas in the conduit, may be communicated to signal processor 130 (FIG. 5). Of course, the calibration and pressure sensor functions operate independently, and can be separated by appropriate valving at the distal end of tube 95. A suitable valve mechanism will also be used to prevent the flowing gas mixture from entering calibration gas source 310.

Since gas properties sensor 20 is located in a no-flow chamber, it is sensitive to pressure. Consequently, the accuracy of the gas properties sensor may diminish as the pressure deviates from a calibration pressure. To compensate for such pressure related inaccuracies, the signals generated by the gas properties sensor may be corrected based upon the pressure readings generated by the pressure transducer.

Figure 11:
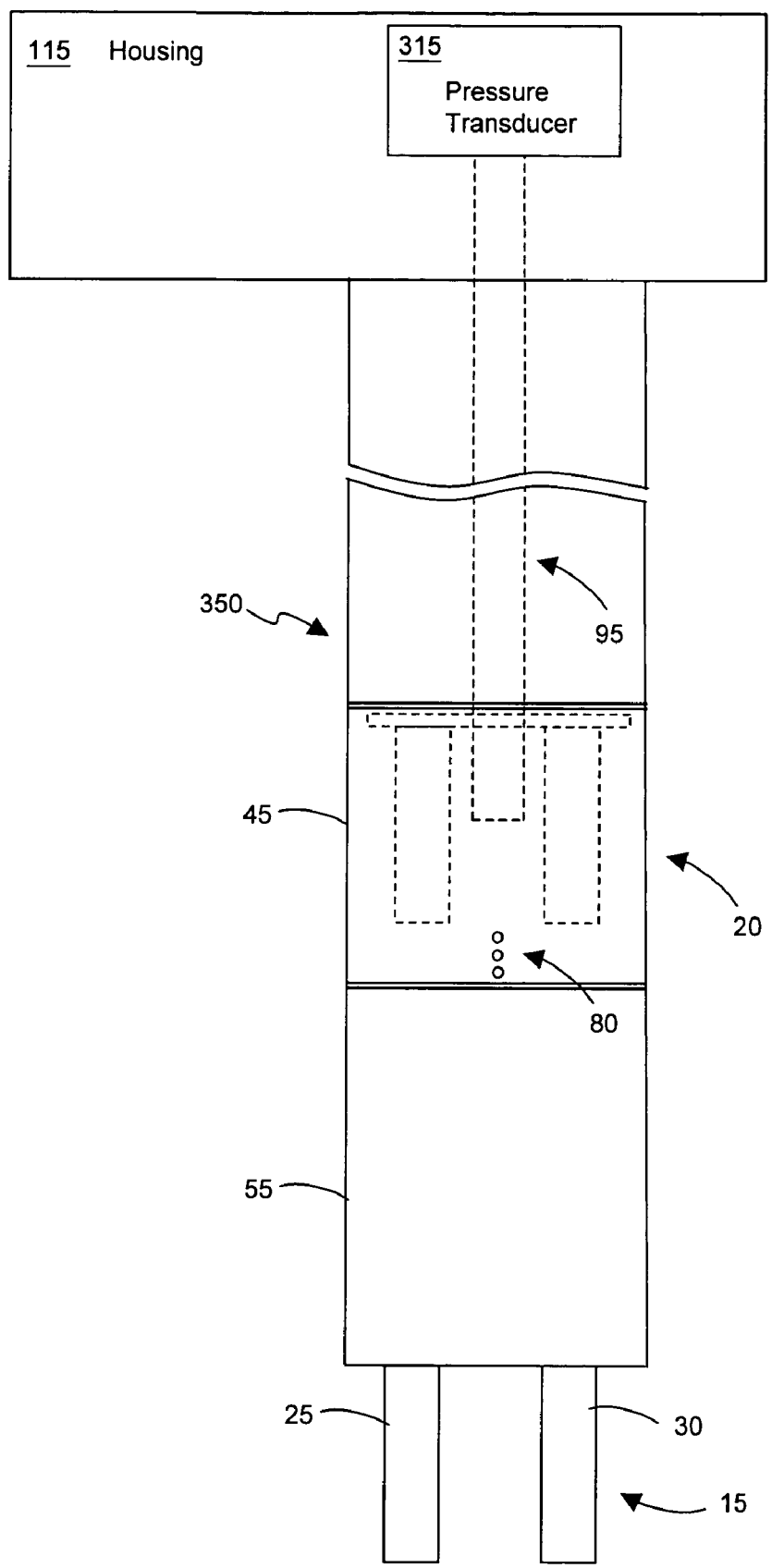
FIG. 11 is a side view of a flowmeter probe configured with pressure sensing capabilities in accordance with another alternative embodiment of the present invention.

Although the calibration check gas source and the pressure transducer share a common tube, this in not a requirement and each of these devices may be independently configured with separate tubes, if desired. Probe 300 is shown having both the calibration function and a pressure transducer, but other possibilities exist where only one of these functions are implemented. An example of a probe configured with a pressure sensor is depicted in FIG. 11. In this figure, probe 350 is shown having pressure transducer 315, but does not implement a calibration function as does probe 300. Another distinction is that tube 95 terminates within the no-flow chamber of mid-well 45, adjacent to the active and reference sensors of gas properties sensor 20. Pressure readings of the flowing gas media may be obtained from the gas that enters the no-flow chamber of the mid-well.

The flow and gas properties sensors have been shown in relative close proximity to the flowmeter controls and electronics in housing 115. However, it is equally possible that any or all elements of the flowmeter may be remotely located with respect to the conduit and the sensors or other signal-producing elements which have an active relationship with the flowing media. Signals generated by the various sensor components can be connected by wires or these components may be wirelessly coupled.

The normal signal and power wires have not been shown but would pass through the probe from housing 115 to the sensor elements. In the embodiments having a tube within the probe (FIGS. 3, 10, 11), the wires could be housed in the tube.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed with reference to the claims.

What is claimed is:

1. A compensated flowmeter for flowing media in a conduit, said flowmeter comprising:

a probe adapted to project into said media in said conduit;

a thermal dispersion sensor mounted on said probe and adapted to provide output signals relating to a flow rate of said media, said thermal dispersion sensor comprising an integrated active/reference sensor element operating in time-shared fashion such that said integrated active/reference sensor element is a heated, active sensor for a predetermined period of time, and after being permitted to cool, said integrated active/reference sensor serves as a substantially unheated, reference sensor;

a compensating gas properties sensor mounted within a no-flow chamber of said probe and adapted to provide output signals relating to heat transfer of said media; and a processor for adjusting said flow rate detected by said thermal dispersion sensor to compensate for changes in heat transfer detected by said compensating gas properties sensor.

2. The flowmeter according to claim 1, and further comprising:

a pressure transducer in communication with said probe; and a gas tube coupled with said pressure transducer and having an open end positioned relative to said thermal dispersion sensor, and wherein said gas tube is in communication with the flowing media, the pressure of the flowing media being measured by said pressure transducer.

3. The flowmeter according to claim 1, wherein said compensating gas properties sensor comprises an integrated active/reference sensor element operating in time-shared fashion such that said integrated active/reference sensor element is a heated, active sensor for a predetermined period of time, and after being permitted to cool, said integrated active/reference sensor serves as a substantially unheated, reference sensor.

4. The flowmeter according to claim 1, wherein said compensating gas properties sensor comprises a compensating active sensor element and a compensating reference sensor element.

5. The flowmeter according to claim 1, wherein said media comprises a mixed-gas composition.

6. The flowmeter according to claim 1, wherein said media comprises a variable mixed-gas composition.

7. The flowmeter according to claim 1, wherein said media comprises a variable mixed-gas composition exhibiting a variable range of heat transfer.

8. The flowmeter according to claim 1, wherein said no-flow chamber is formed in a mid-well portion of said probe, said mid-well portion comprising at least one aperture permitting said media to enter said no-flow chamber and to come into contact with said compensating gas properties sensor.

9. The flowmeter according to claim 8, wherein said mid-well portion includes a baffle to further restrict the flow of said media within said no-flow chamber.

10. The flowmeter according to claim 1, and further comprising:
a calibration check gas source in communication with said probe; and
a gas tube coupled with said calibration check gas source and having an open end positioned relative to said thermal dispersion sensor, and wherein said calibration check gas source is adapted to introduce a calibration check gas into said gas tube at a predetermined velocity so that said calibration check gas is projected from said open end and impinges upon said thermal dispersion sensor.

11. The flowmeter according to claim 10, and further comprising:
a pressure transducer in communication with said probe and coupled with said gas tube, and wherein said gas tube is in communication with the flowing media, the pressure of the flowing media being measured by said pressure transducer.

12. A method for determining compensated flow of flowing media in a conduit, the method comprising:
mounting a thermal dispersion sensor on a probe adapted to monitor the flow of said media in said conduit, wherein said thermal dispersion sensor responsively provides output signals relating to a flow rate of said media, said thermal dispersion sensor comprising an integrated active/reference sensor element operating in time-shared fashion such that said integrated active/reference sensor element is a heated, active sensor for a predetermined period of time, and after being permitted to cool, said integrated active/reference sensor serves as a substantially unheated, reference sensor;
mounting a compensating gas properties sensor within a no-flow chamber of said probe, wherein said compensating gas properties sensor responsively provides output signals relating to heat transfer of said media; and
adjusting said flow rate detected by said thermal flow sensor to compensate for changes in heat transfer detected by said compensating gas properties sensor.

13. The method according to claim 12, said method further comprising:
measuring pressure of said flowing media using a pressure transducer in communication with said probe and coupled with a gas tube, wherein said gas tube permits said flowing media to migrate into an open end of said gas tube where it is received and measured by said pressure transducer.

14. The method according to claim 12, wherein said compensating gas properties sensor comprises an integrated active/reference sensor element operating in time-shared fashion such that said integrated active/reference sensor element is a heated, active sensor for a predetermined period of time, and after being permitted to cool, said integrated active/reference sensor serves as a substantially unheated, reference sensor.

15. The method according to claim 12, wherein said compensating gas properties sensor comprises a compensating active sensor element and a compensating reference sensor element.

16. The method according to claim 12, wherein said media comprises a mixed-gas composition.

17. The method according to claim 12, wherein said media comprises a variable mixed-gas composition.

18. The method according to claim 12, wherein said media comprises a variable mixed-gas composition exhibiting a variable range of heat transfer.

19. The method according to claim 12, wherein said no-flow chamber is formed in a mid-well portion of said probe, said mid-well portion comprising at least one aperture permitting said media to enter said no-flow chamber and to come into contact with said compensating gas properties sensor.

20. The method according to claim 19, wherein said mid-well portion includes a baffle to further restrict the flow of said media within said no-flow chamber.

21. The method according to claim 12, said method further comprising:
introducing calibration check gas into a gas tube at a predetermined velocity so that said calibration check gas impinges upon said thermal dispersion sensor.

22. The method according to claim 21, said method further comprising:
measuring pressure of said flowing media using a pressure transducer in communication with said probe and coupled with said gas tube, wherein said gas tube permits said flowing media to migrate into an open end of said gas tube where it is received and measured by said pressure transducer.

23. A compensated flowmeter for flowing media in a conduit, said flowmeter comprising:
a probe adapted to project into said media in said conduit;
a thermal dispersion sensor mounted on said probe and adapted to provide output signals relating to a flow rate of said media;
a compensating gas properties sensor mounted within a no-flow chamber of said probe and adapted to provide output signals relating to convective heat transfer of said media, said compensating gas properties sensor comprising an integrated active/reference sensor element operating in time-shared fashion such that said integrated active/reference sensor element is a heated, active sensor for a predetermined period of time, and after being permitted to cool, said integrated active/ reference sensor serves as a substantially unheated, reference sensor; and a processor for adjusting said flow rate detected by said thermal dispersion sensor to compensate for changes in heat transfer detected by said compensating gas properties sensor.

24. A method for determining compensated flow of flowing media in a conduit, the method comprising:

mounting a thermal dispersion sensor on a probe adapted to monitor the flow of said media in said conduit, wherein said thermal dispersion sensor responsively provides output signals relating to a flow rate of said media;

mounting a compensating gas properties sensor within a no-flow chamber of said probe, wherein said compensating gas properties sensor responsively provides output signals relating to heat transfer of said media, said compensating gas properties sensor comprises an integrated active/reference sensor element operating in time-shared fashion such that said integrated active/reference sensor element is a heated, active sensor for a predetermined period of time, and after being permitted to cool, said integrated active/reference sensor serves as a substantially unheated, reference sensor; and adjusting said flow rate detected by said thermal flow sensor to compensate for changes in heat transfer detected by said compensating gas properties sensor.

* * * * *